Patented Jan. 25, 1944

2,340,170

UNITED STATES PATENT OFFICE 2,340,170

VACUUM DRYING FOOD PRODUCTS

John M. Baer, Chicago, Ill., assignor to The Guardite Corporation, a corporation of Illinois No Drawing. Application September 24, 1941, Serial No. 412,202

11 Claims. (Cl. 99—204)

This invention relates to the vacuum drying of organic products and particularly those intended for food uses and having an initial moisture content of a high order.

As set forth in my co-pending application Serial No. 412,201, filed September 24, 1941, it has heretofore been the practice in vacuum drying organic material such as potatoes, carrots, onions, and similar vegetables, as well as fruits and other products, to precook the material before drying. My co-pending application relates to a process of drying such products without cooking, either before or during the vacuum process and the present invention relates to a particular application of such process in which the enzymes in the product are destroyed before any considerable amount of drying occurs.

In many organic products, such as the potato, apple, or peach, oxidation occurs rapidly upon exposure of the surface of the fruit or vegetable to the air. This tendency is greatly decreased upon a reduction of the moisture content. But enzyme activity may occur during the drying operation, if air is present, or upon rewetting of the product for use after the drying is complete.

In accordance with the present invention products are heated in the complete absence of air to a temperature at which the enzymes are destroyed and maintained at such temperature for a short period to destroy the enzymes, but not long enough materially to cook the product. Thereafter the product is rapidly cooled in the absence of air to a lower temperature at which drying is carried on.

In carrying out the invention the product, for example, a potato of natural moisture content, is sliced into slices which are preferably not greater than one-quarter inch in cross section and the slices placed quickly in a vacuum chamber. A vacuum of the type described in Merriam and Wiles Patent 2,080,179, which issued May 11, 1937, is then produced on the product, causing the abolition of steam at natural temperatures of the product, and the operation is continued until the product and the chamber are free from air. In some cases, if the relative volume of product to chamber is small the removal of air should be assisted by the introduction of steam to the chamber. As soon as the product is free from air it is rapidly heated by the introduction of steam at increased pressure to raise the temperature of the product to approximately 140° F. at which point it is maintained for a short interval only. In most cases the product should not be maintained at 140° for more than about two minutes. Owing to the absence of air oxidation cannot occur and furthermore the absence of air permits instantaneous heat transfer so that all portions of the product are heated at substantially the same rate and the rate may be far more rapid than is possible with ordinary heating devices.

For example, a large mass of potatoes, apples, or other like material may be heated from say 65° F. to 140° F. within one or two minutes, or even less, and would depend solely upon the amount of steam available. The ability to heat the products rapidly to a blanching temperature is an important feature of the present invention.

After the material has been at the blanching temperature for a period sufficient to destroy detrimental enzymes and before any appreciable cooking of the product occurs, the temperature is rapidly lowered. This may be accomplished by a rapid reduction of pressure in the chamber which causes a corresponding reduction in temperature due to evaporation of moisture from the surfaces of the hot material.

Preferably the pressure is reduced below 25 millimeters absolute and at this point the product is heated to provide means for evaporating the water which it is desired to remove during the drying operation. This heat may be supplied in any desired manner, but it is preferred for reasons of economy to use enclosed steam coils appropriately heated. Electromagnetic energy may be supplied by appropriate sources or electric infrared generators employed.

During the drying operation the pressure may be maintained uniform or it may be continually reduced. In the batch system pressure may be progressively lowered in the single chamber. In a continuous system the blanching step may be carried out in one chamber followed by removal of the product while hot through an air lock directly to a chamber maintained under a low absolute pressure. The product may then be passed through similar air locks to one or more other chambers under progressively lower pressure.

Inasmuch as in most products it is desired to avoid a high temperature it is advisable to employ a progressively lower pressure as drying proceeds in order to avoid the use of a progressively higher temperature. Thus, although a pressure of 20 to 25 millimeters is frequently used in the early stages of drying, while the moisture content of the product is still high, as the moisture content is reduced and the water vapor pressure of the product lowered, I prefer to reduce the pressure within the chamber. In many instances the final absolute pressure may be as low as 1 to 2 millimeters, although generally from 2 to 4 millimeters final pressure is preferred.

As an example of the invention, diced carrots with a normal moisture content were freed from air under low pressure and then steam introduced promptly to raise the temperature of the product to 140° F. at which temperature they were maintained for two minutes. Pressure was then promptly reduced 25 millimeters which brought the temperature of the product to approximately 81° F. The carrots were subjected to radiant heat and continued evacuation at substantially the same temperature until the temperature thereof began to rise markedly, after which the pressure was progressively reduced to maintain a maximum temperature of about 120° F. until the carrots were substantially dry. During the drying operation the carrots lost 88% of their weight.

As another example of the process, potatoes were cut in one-quarter inch cubes and freed from air, heated with steam to 140°, held at that temperature for two minutes and then the pressure reduced quickly to 25 millimeters which brought the temperature of the potatoes to about 81°. Radiant heat was employed together with further suction to maintain a temperature of about 120° F. in the potatoes, the pressure being progressively reduced as necessary to accomplish this result. The potatoes lost about 82% of their weight in the drying process.

The foregoing detailed description has been given for clearness of understanding only, and no unnecessary limitations should be understood therefrom.

What I claim as new, and desire to secure by Letters Patent, is:

1. The method which comprises subjecting an organic product containing a major proportion of water and containing active enzymes to a pressure sufficiently low to cause boiling of contained moisture at substantially atmospheric temperature, removing the air from the product and replacing it with an atmosphere of steam under substantially such low pressure, introducing steam to raise the temperature and pressure of the product within not substantially more than two minutes to a blanching temperature and blanching the product thereunder, promptly cooling the product by reducing the pressure, and then supplying heat to the product under vacuum to remove moisture therefrom.

2. The method as set forth in claim 1, in which the product is dried to a low moisture content at a temperature below 120° F.

3. The method as set forth in claim 1, in which the product is a raw product.

4. The method as set forth in claim 1, in which the product is a raw starchy product.

5. The method as set forth in claim 1, in which the product is a raw fruit.

6. The method as set forth in claim 1, in which the product is a raw vegetable.

7. The method as set forth in claim 1 in which the product is not maintained at a temperature of 140° F. for a period substantially longer than two minutes.

8. The method which comprises subjecting an organic product containing a major portion of water and containing active enzymes to a pressure low enough to cause boiling of contained moisture at substantially atmospheric temperature, removing the air from the product under substantially such pressure and replacing it with an atmosphere of steam, introducing steam in a quantity and at a temperature rapidly to raise the temperature of and pressure upon the product until the temperature has reached an enzyme destroying temperature of at least 140° F., maintaining the product at that temperature for a short period to destroy the enzymes, then rapidly cooling the product by reducing the pressure thereon while maintaining an atmosphere substantially of steam, and then supplying heat to the product while maintaining a substantial vacuum and removing the moisture from the product under the heat in vacuum to produce a substantially dry, stable product.

9. The method which comprises subjecting an organic product containing a major portion of water and containing active enzymes to a pressure low enough to cause boiling of contained moisture at substantially atmospheric temperature, removing the air from the product under substantially such pressure and replacing it with an atmosphere of steam, introducing steam in a quantity and at a temperature rapidly to raise the temperature of and pressure upon the product until the temperature has reached an enzyme destroying temperature of at least 140° F., maintaining the product at that temperature for a short period to destroy the enzymes without cooking the product, then rapidly cooling the product by reducing the pressure thereon while maintaining an atmosphere substantially of steam, and then supplying heat to the product while maintaining a substantial vacuum and removing the moisture from the product under the heat in vacuum to produce a substantially dry, stable product.

10. The method as set forth in claim 9 in which the product is heated to 140° F., is not substantially more than two minutes after introduction of heating steam commences.

11. The method as set forth in claim 9 in which the temperature is maintained approximately at 140° F. for about two minutes.

JOHN M. BAER.